United States Patent

Hashizume et al.

[11] Patent Number: 6,072,635
[45] Date of Patent: Jun. 6, 2000

[54] DICHROIC PRISM AND PROJECTION DISPLAY APPARATUS

[75] Inventors: Toshiaki Hashizume, Okaya; Akitaka Yajima, Tatsuno-machi, both of Japan

[73] Assignee: Seiko Epson Corporation, Tokyo, Japan

[21] Appl. No.: 09/112,132

[22] Filed: Jul. 9, 1998

[30] Foreign Application Priority Data

Jul. 15, 1997  [JP]  Japan ................................. 9-190005

[51] Int. Cl.[7] ........................... G02B 27/12; G02B 27/14
[52] U.S. Cl. ........................................... 359/640; 359/634
[58] Field of Search ................................. 359/634, 637, 359/640

[56] References Cited

U.S. PATENT DOCUMENTS 5,098,183  3/1992  Sonehara et al. .......................... 353/31
5,221,998  6/1993  Sugahara .................................. 359/831

FOREIGN PATENT DOCUMENTS

7-294845  11/1995  Japan .

*Primary Examiner*—Ricky Mack
*Attorney, Agent, or Firm*—Oliff & Berridge, PLC

[57] ABSTRACT

The invention provides a dichroic prism capable of reducing displacements of projection pixels of colors caused by chromatic aberration of magnification. A dichroic prism is formed in the shape of a quadrangular prism as a whole by joining four rectangular prisms together. A red reflecting dichroic plane and a blue reflecting dichroic plane intersect to form substantially an X shape along junction surfaces of the prisms. The red reflecting dichroic plane is convex-shaped by partly changing the thickness of an adhesive layer for connecting the rectangular prisms together. Accordingly, since a red beam can be guided to a projection optical system while being enlarged, it is possible to reduce a projection image of the red beam to be projected onto a projection plane via the projection optical system. This makes it possible to reduce relative displacements of projection pixels of color beams caused by chromatic aberration of magnification.

18 Claims, 11 Drawing Sheets

DICHROIC PRISM AND PROJECTION DISPLAY APPARATUS

BACKGROUND OF THE INVENTION

1. Field of Invention

The present invention relates to a projection display apparatus that separates light emitted from a light source into color beams of at least two colors, modulates these color beams via light valves formed of liquid crystal panels according to image information, synthesizes the modulated color beams again, and projects and displays the synthesized beams onto a projection plane via a projection optical system. More particularly, the present invention relates to a dichroic prism capable of correcting relative displacements of projection pixels of the colors caused by chromatic aberration of magnification.

2. Description of Related Art

A well-known type of projection display apparatus includes a light source, a color separation device that separates a light beam emitted from the light source into color beams of three colors, three light valves for modulating the separated color beams according to image information, a dichroic prism serving as a color synthesizing device that synthesizes the color beams modulated by the three light valves, and a projection optical system for enlarging and projecting the beams synthesized by the dichroic prism onto a projection plane.

Figure 11:
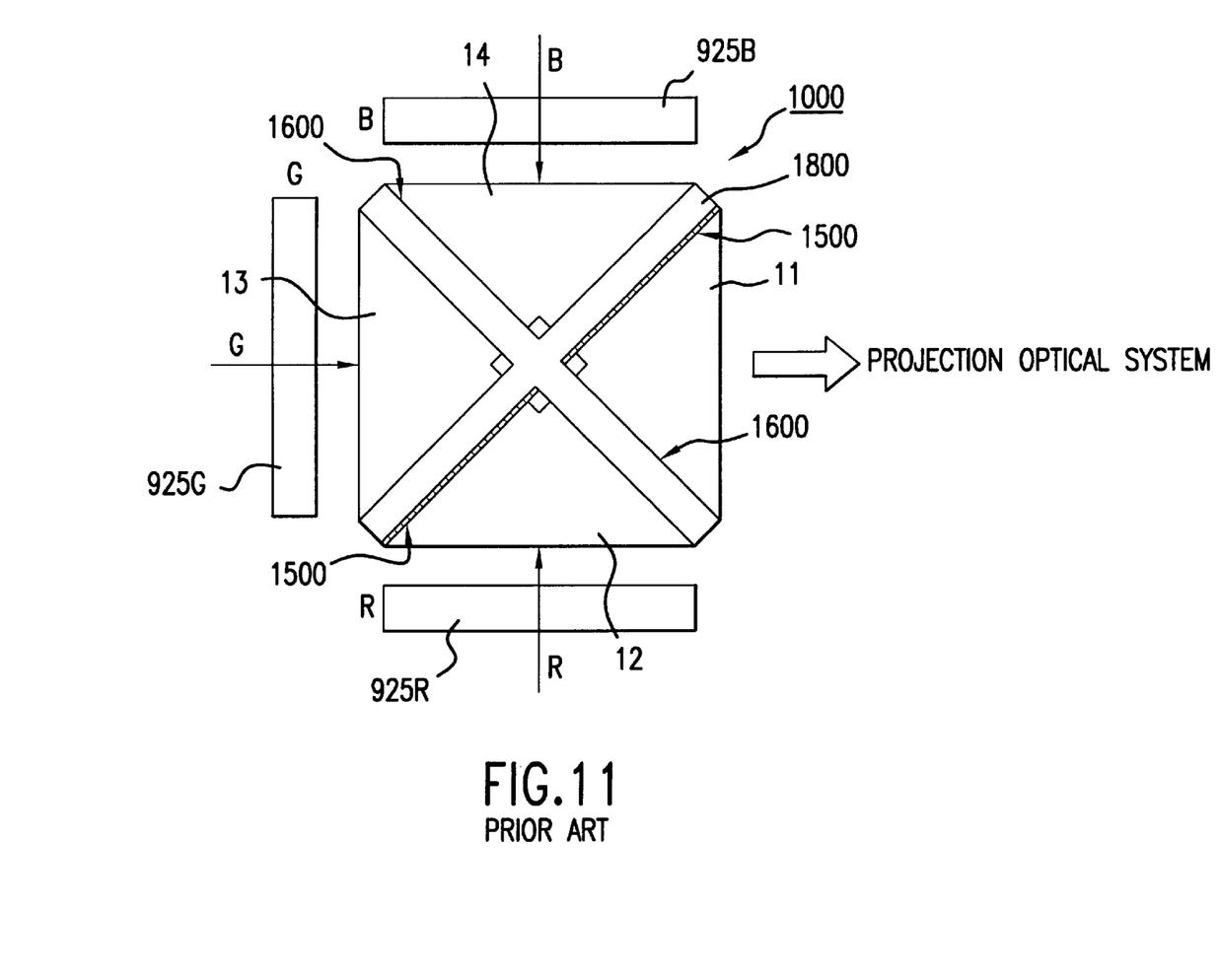
FIG. 11 is an enlarged plan view of a conventional dichroic prism.

The dichroic prism is disclosed in, for example, Japanese Unexamined Patent Publication No. 7-294845. As shown in FIG. 11, a dichroic prism 1000 disclosed in this publication is shaped like a quadrangular prism as a whole by bonding four rectangular prisms 11, 12, 13, and 14 having a cross-section shaped like a rectangular isosceles triangle. In this dichroic prism 1000, red reflecting dichroic planes 1500 and 1500 and blue reflecting dichroic planes 1600 and 1600 diagonally extend along the junction surfaces of the prisms 11–14 so that they form a flat red reflecting dichroic plane and a flat blue reflecting dichroic plane, respectively. A layer of an adhesive 1800, which is formed between the junction surfaces to join the rectangular prisms 11–14, is 10 µm to 20 µm thick.

Such a dichroic prism 1000 is used as a color synthesizing device in a projection display apparatus. In this case, color beams R, G, and B from liquid crystal light valves 925R, 925G, and 925B, which are placed to oppose three sides of the dichroic prism 1000, are synthesized by the pair of dichroic planes 1500 and 1600, and the synthesized beams are emitted from the other side of the dichroic prism 1000 toward a projection optical system.

Figure 12:
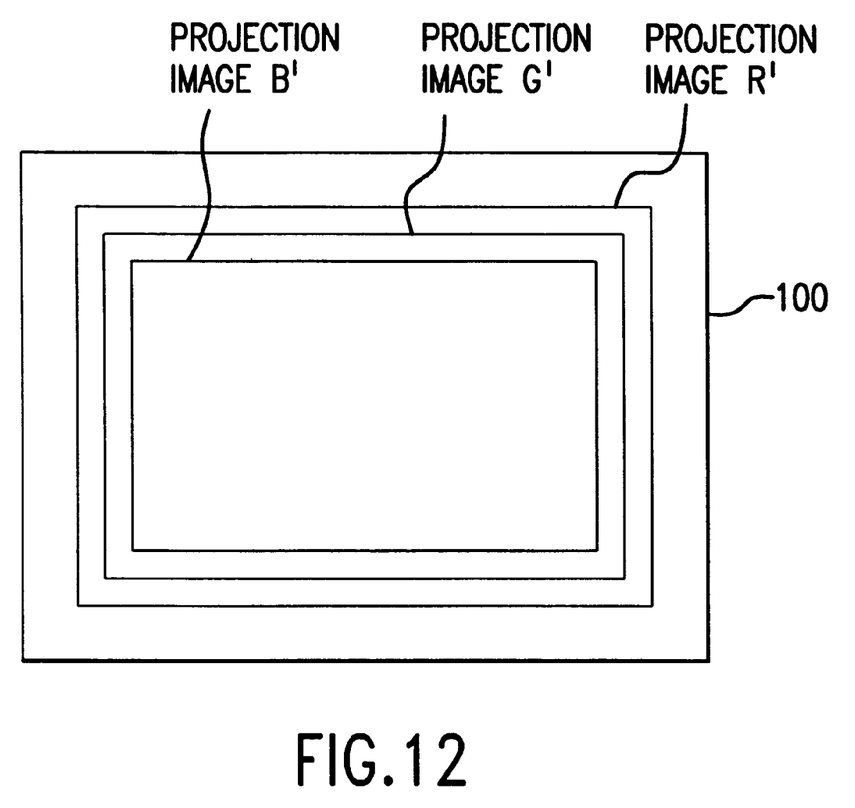
FIG. 12 is an explanatory view showing the differences in size among projection images of colors due to chromatic aberration of magnification.
Figure 13A:
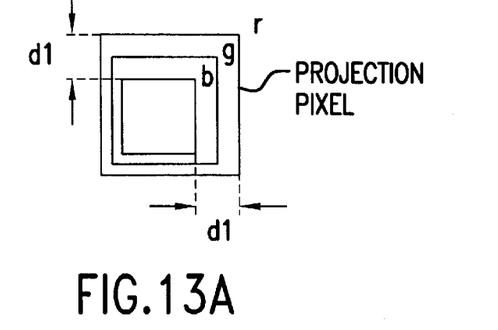
FIGS. 13(A)–13(C) are explanatory views showing displacements of projection pixels of the colors due to chromatic aberration of magnification.
Figure 13B:
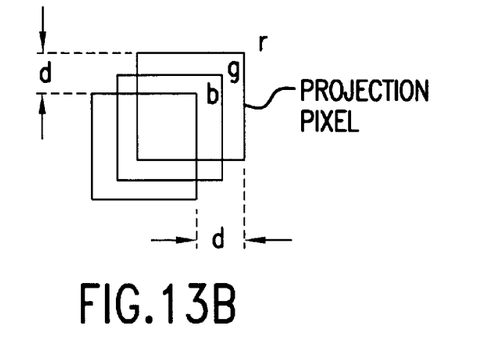
Figure 13C:
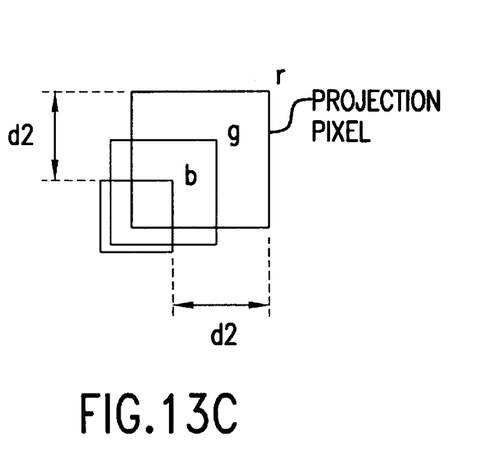

Since the influence of chromatic aberration of magnification on images of the colors, which are projected and displayed via the projection optical system, increases with the distance from the center, displacements of the projection images of the colors become large. For example, as shown in FIG. 12, the areas of color projection images projected on a projection plane 100, a blue projection image B', a green projection image G', and a red projection image R', increase in this order. In terms of projection pixels, projection pixels b, g, and r of the colors are not in complete alignment, as shown in FIGS. 13(A)–13(C), and there is a pixel displacement d1. While the pixel displacement d1 hardly affects display quality when it is small (d1≦d), it degrades the quality of a projection image when it exceeds the permitted limit (d≦d1=d2). The sizes of the color projection images R', G', and B' vary with the material of the projection optical system. The red projection image R' is not always the largest, and the areas of the projection images of the colors relatively differ from one another.

In the industry associated with projection display apparatuses, efforts have been made to increase the definition of a light valve formed of a liquid crystal panel and the like by increasing the number of pixels of the light valve. There has been a tendency to reduce the area of each pixel with this increase of definition, which lowers the permitted limit of the above-described pixel displacement d1 and decreases the tolerance for chromatic aberration of magnification. Therefore, there is a need to reduce the influence of chromatic aberration of magnification on a projection image by correcting chromatic aberration of magnification, in order to obtain a high-resolution and high-quality projection image.

SUMMARY OF THE INVENTION

In view of the above problems, an object of the present invention is to provide a dichroic prism that can reduce displacements of projection pixels of colors caused by chromatic aberration of magnification. Another object of the present invention is to provide a projection display apparatus in which the dichroic prism is incorporated.

In order to achieve the above objects, the present invention provides a dichroic prism that is formed by joining four prisms of a triangular cross-section, and is provided with first and second dichroic planes intersecting so as to form approximately an X shape along joint surfaces of the prisms and having different reflectance characteristics, wherein at least the first dichroic plane of the first and second dichroic planes is either concave or convex.

In such a dichroic prism of the present invention, the reflection state of a color beam to be reflected from the first dichroic plane varies depending on the degree of concavity or convexity of the first dichroic plane. Therefore, it is possible to either enlarge or reduce the color beam. Since the magnification of a projection image of a desired color beam can be adjusted through the use of the dichroic prism of the present invention as a color synthesizing device in the projection display apparatus, the areas of projection images of colors can be made almost equal. That is, it is possible to correct chromatic aberration of magnification, and to thereby reduce relative displacements of projection pixels of the color beams. Accordingly, the use of the dichroic prism of the present invention as a color synthesizing device in the projection display apparatus makes it possible to prevent degradation of a projection image due to chromatic aberration of magnification.

There has been a trend in the industry associated with projection display apparatuses to increase the definition of the light valve in order to obtain a projection image with higher resolution. In this case, the permitted limit of pixel displacements is lowered, and the tolerance for chromatic aberration of magnification is decreased. Since the dichroic prism of the present invention can, as mentioned above, correct chromatic aberration of magnification and thereby reduce relative displacements of pixels of the colors, it is particularly suitable for a color synthesizing device to be employed in a projection display apparatus that projects a high-resolution and high-quality image through the use of a high-definition light valve.

It is preferable that the first dichroic plane be inclined symmetrically with respect to a line of intersection of the first and second dichroic planes. Although the first dichroic plane may be, for example, curved, since it is necessary in this case to manufacture the prisms focusing on the radius of curvature and the like, manufacturing of the dichroic prism is expected to be difficult. Accordingly, when the first dichroic plane is formed as described above, it is possible to facilitate the manufacturing and to prevent a steep rise in manufacturing cost.

Rectangular prisms having a right vertical angle may be used as the prisms of triangular cross-section. In this case, the first dichroic plane can be made concave or convex by adjusting the thickness of an adhesive layer for joining these rectangular prisms. Such use of the rectangular prisms allows the rectangular prisms to constitute the conventional dichroic mirror to be used unchanged.

When at least one of the four prisms is replaced with a prism having an acute or obtuse vertical angle, it is possible to naturally make the first dichroic plane concave or convex without intentionally adjusting the thickness of the adhesive layer.

The dichroic prism of the present invention can be used as a color synthesizing device in a projection display apparatus. That is, it can be used as a color synthesizing device in a projection display apparatus that includes a light source, a color separation device that separates a light beam emitted from the light source into color beams of at least two colors, a modulation device that modulates the separated color beams according to image information, the color synthesizing device that synthesizes the color beams modulated by the modulation device, and a projection optical system for enlarging and projecting the synthesized beams onto a projection plane. Since the dichroic prism, to which the present invention is applied, can adjust the magnification of a desired color beam as mentioned above, the projection display apparatus employing the dichroic prism as the color synthesizing device can reduce relative displacements of projection pixels, and can prevent degradation of image quality due to chromatic aberration of magnification. In particular, since the projection display apparatus can reduce the relative displacements of projection pixels of the colors even when it employs a high-definition light valve as a modulation device, it is possible to obtain a high-resolution and high-quality projection image.

A transmissive and reflective modulation device may be used as the modulation device of the projection display apparatus. When the reflective modulation device is used, the dichroic prism, to which the present invention is applied, can be used not only as the color synthesizing device, but also as the color separation device. Since the optical system of the projection display apparatus can be constituted by a small number of optical components by enabling the dichroic prism, to which the present invention is applied, to function as the color synthesizing device and the color separation device, it is possible to reduce the size and cost of the projection display apparatus.

DETAILED DESCRIPTION OF PREFERRED EMBODIMENTS

Dichroic Prism

Figure 1:
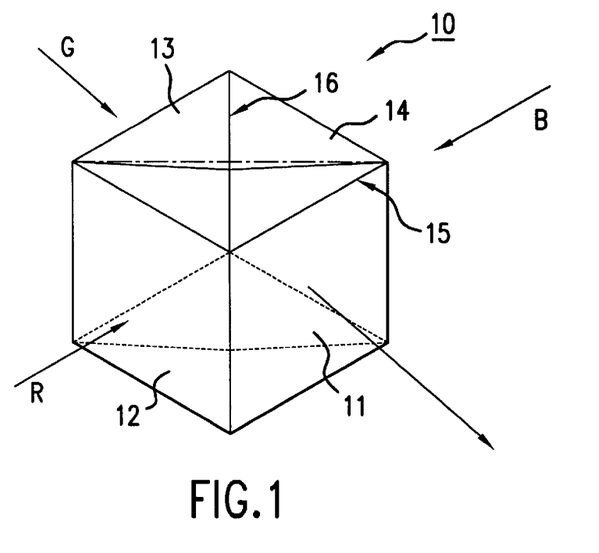
FIG. 1 is a perspective view of a dichroic prism to which the present invention is applied.

An example of a dichroic prism to which the present invention is applied is described below with reference to the drawings. FIG. 1 is a perspective view of the dichroic prism to which the present invention is applied. A dichroic prism 10 shown in FIG. 1 is intended to synthesize color beams R, G, and B that are modulated by three liquid crystal light valves, and it has a function of emitting the color beams R, G, and B, which are incident from different directions, together toward a projection optical system. The three liquid crystal light valves are therefore shown together with the dichroic prism 10 in FIG. 2. The following description is provided based on the assumption that the areas of projection images of blue, green, and red to be projected onto a projection plane by the projection optical system increase in this order because of chromatic aberration of magnification, as shown in FIG. 12.

As shown in FIG. 1, the dichroic prism 10 includes four rectangular prisms 11, 12, 13, and 14, and is shaped like a quadrangular prism as a whole by joining these rectangular prisms 11–14 together.

Figure 2:
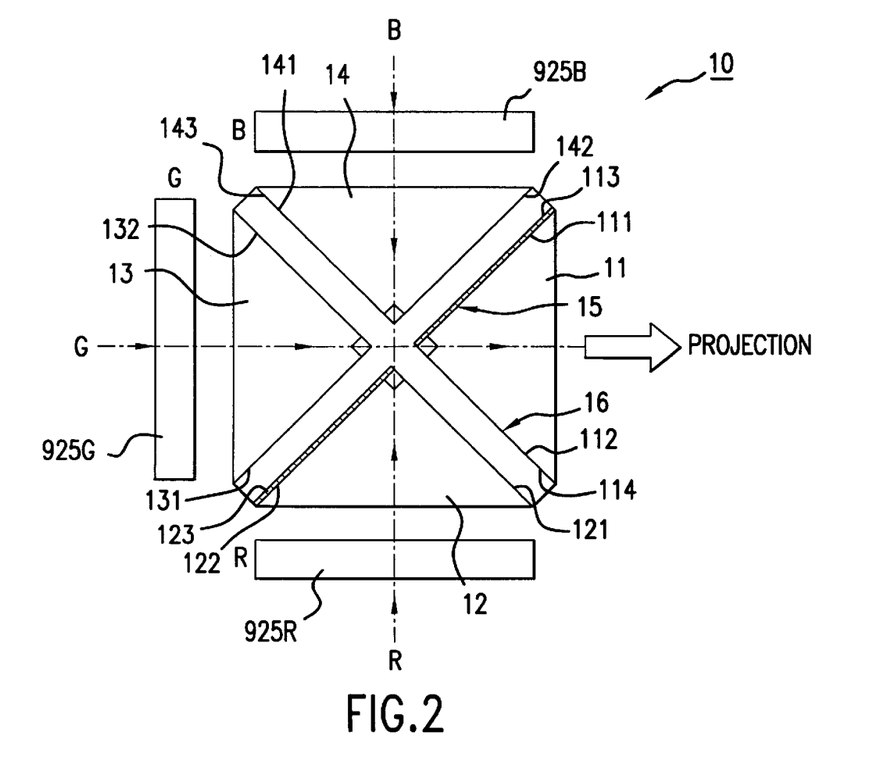
FIG. 2 is an enlarged plan view of the dichroic prism shown in FIG. 1.

As shown in FIG. 2, one rectangular side 111 of rectangular sides 111 and 112 of the first rectangular prism 11, which intersect at right angles, is provided with a red reflecting film 113 made of a dielectric multilayer film for reflecting the red beam R, and the other rectangular side 112 is provided with a blue reflecting film 114 made of a dielectric multilayer film for reflecting the blue beam B.

One rectangular side 121 of rectangular sides 121 and 122 of the second rectangular prism 12, which intersect at right angles, is not provided with a specific reflecting film and is joined to the rectangular side 112 of the first rectangular prism 11 through an adhesive layer 118. The other rectangular side 122 is provided with a red reflecting film 123 having similar optical properties to those of the red reflecting film 113 formed on the rectangular side 111 of the first rectangular prism 11.

Rectangular sides 131 and 132 of the third rectangular prism 13, which intersect at right angles, are not provided with specific reflecting films, and they are exposed. One rectangular side 131 of these rectangular sides 131 and 132 is joined to the rectangular side 122 of the second rectangular prism 12 through the adhesive layer 18.

One rectangular side 141 of rectangular sides 141 and 142 of the fourth rectangular prism 14, which intersect at right angles, is provided with a blue reflecting film 143 having similar optical properties to those of the blue reflecting film 114 formed on the rectangular side 112 of the first rectangular prism 11, and the other rectangular side 142 is not provided with a specific reflecting film. One rectangular side 141 is joined to the rectangular side 132 of the third rectangular prism 13 through the adhesive layer 118, and the other rectangular side 142 is joined to the rectangular side 111 of the first rectangular prism 11 through the adhesive layer 118.

The red reflecting film 113, the blue reflecting film 114, the red reflecting film 123, and the blue reflecting film 143 are located along joint surfaces that are formed by joining the rectangular prisms 11–14 together, whereby a red reflecting dichroic plane 15 and a blue reflecting dichroic plane 16 intersect so as to form approximately an X shape.

In the dichroic prism 10 of this embodiment, the red reflecting dichroic plane 15 is inclined symmetrically with respect to a line of intersection of the red reflecting dichroic plane 15 and the blue reflecting dichroic plane 16 by partly changing the thickness of the adhesive layer 118 for joining the rectangular prisms 11–14 together. That is, the red reflecting dichroic plane 15 is convex in the dichroic prism 10 of this embodiment.

For the red reflecting dichroic plane 15 to be convex-shaped, for example, the thickness of the adhesive layer 118 is adjusted in the following manner. The first and fourth rectangular prisms 11 and 14 are joined through the adhesive layer 118 of uniform thickness, thereby forming a compound prism. Then, the second and third rectangular prisms 12 and 13 are similarly joined, thereby forming a compound prism. Next, the pair of compound prisms are joined so that the adhesive layer 118 has a gradual increase in thickness from one end of the joint surface to the other end. As a result, the red reflecting dichroic plane 15 of the obtained dichroic prism 10 is convex-shaped with the center being at the highest point. To make the red reflecting dichroic plane 15 concave, the adhesive layer 18 is gradually increased in thickness from the other end to the one end.

In the dichroic prism 10 of this embodiment having such a structure, the green beam G from a liquid crystal light valve for green light 925G passes through the dichroic planes 15 and 16, and emerges from the side of the first rectangular prism 11 toward a projection optical system 60. The blue beam B from a liquid crystal light valve for blue light 925B is caused by the blue reflecting dichroic plane 16 to bend its optical axis by approximately 90 degrees, and emerges from the side of the first rectangular prism 11 toward the projection optical system 60 in a similar manner to the green beam G. Furthermore, the red beam R from a liquid crystal light valve for red light 925R is caused by the red reflecting dichroic plane 15 to bend its optical axis by approximately 90 degrees, and emerges from the side of the first rectangular prism 11 in a similar manner to the green beam G and the blue beam B.

Figure 3:
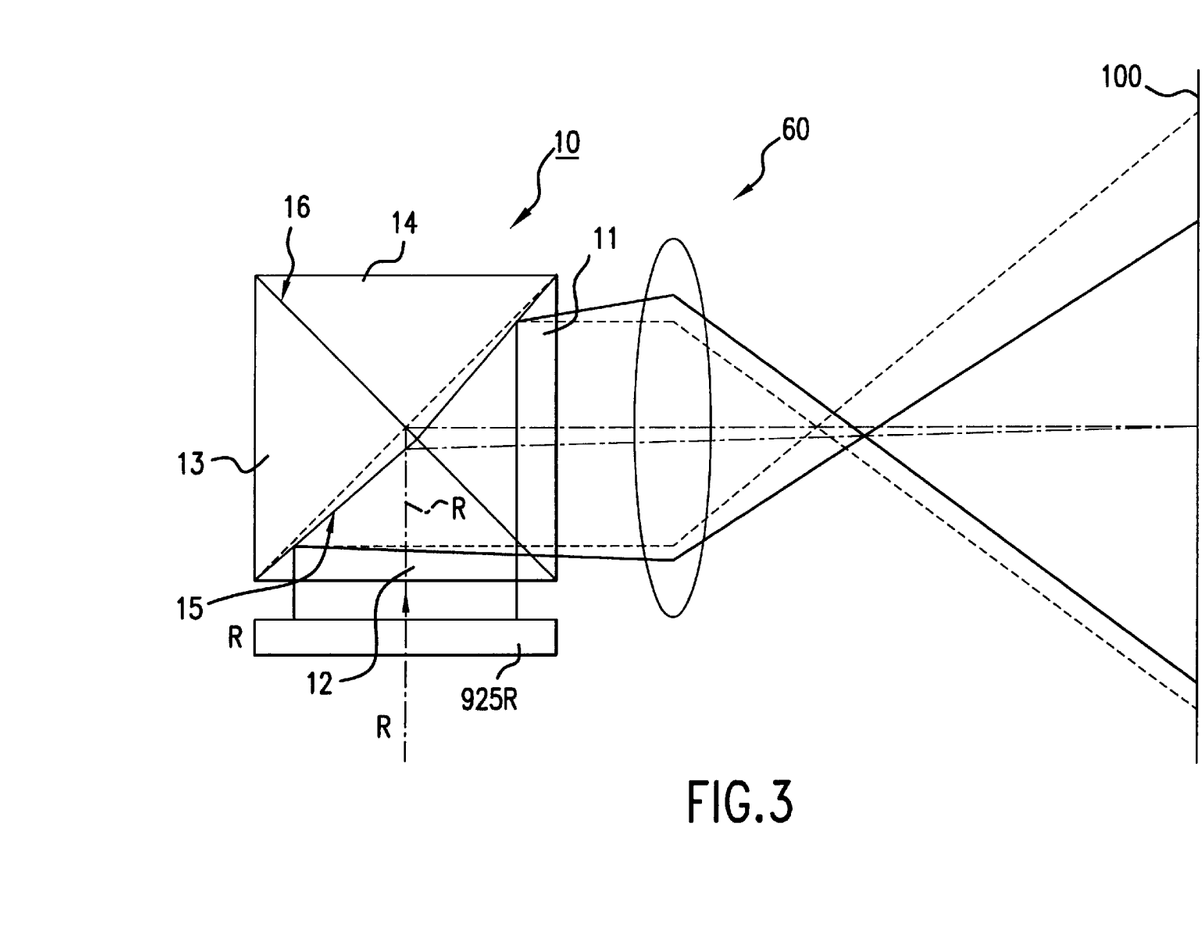
FIG. 3 is an explanatory view showing the state of a red beam to be projected onto a projection plane via the dichroic prism shown in FIG. 1 and a projection optical system.
Figure 4:
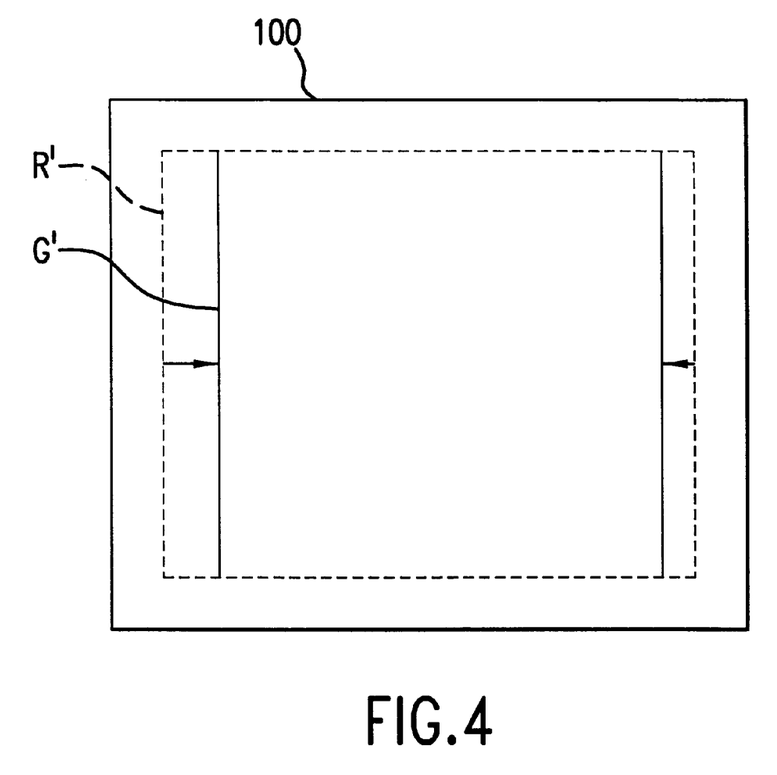
FIG. 4 is an explanatory view showing the size of a projection image of the red beam formed on the projection plane.

FIG. 3 shows a state where the red beam R emitted from the dichroic prism 10 of this embodiment is projected onto the projection plane via the projection optical system 60. Since the red reflecting dichroic plane 15 is convex in the dichroic prism 10 of this embodiment, the red beam R reflected by the red reflecting dichroic plane 15 is emitted toward the projection optical system 60 while being enlarged, as shown by solid lines in FIG. 3. The projection optical system 60 inverts and projects the color beams R, G and B onto a projection plane 100. Therefore, the projection area of the red beam R reflected by the convex red reflecting dichroic plane 15 is smaller than that of a red beam reflected by a flat red reflecting dichroic plane 15. That is, as shown in FIG. 4, a projection image R' of the red beam R (a region enclosed by a broken line in FIG. 4) is larger than a projection image G' of the green beam G (a region enclosed by a solid line in FIG. 4) when the red reflecting dichroic plane 15 is flat, while the area of the projection image R' of the red beam R can be made almost equal to that of the projection image G' of the green beam G by making the red reflecting dichroic plane 15 convex. Therefore, it is possible to reduce relative displacements of projection pixels of the color beams R, G and B that are caused by chromatic aberration of magnification. Accordingly, when the dichroic prism 10 of this embodiment is used as a color synthesizing device in a projection display apparatus, it is possible to prevent a projection image from being degraded by chromatic aberration of magnification, and to thereby achieve a projection display apparatus that provides high quality projection and display.

There has been a trend in the industry associated with projection display apparatuses to increase the definition of light valves serving as modulation devices for higher resolution of projection images, that is, to increase the number of pixels by reducing the area of each pixel. Consequently, the permitted limit of pixel displacements of the colors is lowered, and the tolerance for chromatic aberration of magnification is inevitably decreased. Since the dichroic prism 10 of this embodiment can reduce relative displacements of color pixels by correcting chromatic aberration of magnification as mentioned above, it can meet the tolerance for chromatic aberration of magnification even when the above-mentioned high-definition light valves are adopted, and it can be used as a color synthesizing device in a projection display apparatus that projects a high-resolution and high-quality image.

In the dichroic prism 10 of this embodiment, the four rectangular prisms are employed and the thickness of the adhesive layer 118 is partly adjusted, thereby making the red reflecting dichroic plane 15 convex. Therefore, it is advantageous in that the rectangular prisms for constituting a conventional dichroic prism can also be used unchanged.

In the dichroic prism 10 of this embodiment, displacements of color pixels can be reduced by correcting chromatic aberration of magnification in the same manner as above even when the red reflecting dichroic plane 15 is curved. Since there is a need to manufacture the prisms focusing on the radius of curvature and the like in order to make the red reflecting dichroic plane 15 curved, however, the manufacturing cost is expected to be markedly increased. As mentioned with respect to this embodiment, such a marked increase in manufacturing cost can be avoided by making the red reflecting dichroic plane 15 bent.

While the projection image of the red beam R is reduced by making the red dichroic plane 15 convex in this embodiment, besides this, the projection image of the blue beam B may be enlarged. If the projection images of the three colors are made almost equal in size by thus enlarging the projection image of the blue beam B, it is possible to further reduce the displacements of projection pixels of the color beams. In order to enlarge the projection image of the blue beam B, the blue reflecting dichroic plane 16 is convex-shaped on the side of the incident blue beam B.

Furthermore, while the dichroic prism 10 of this embodiment has been described on the assumption that the areas of the projection images R', G' and B' of the color beams R, G and B decrease in this order, the present invention is not limited to this case, and is applicable to any case, for example, a case in which the projection image B' of the blue beam B is the largest, or a case in which the projection image G' of the green beam G is the largest. The red reflecting dichroic plane 15 is concave-shaped to reduce the projection image R' of the red beam R, and the blue reflecting dichroic plane 16 is convex-shaped to enlarge the projection image B' of the blue beam B. A desired ratio of enlargement or reduction of a projection image of a desired color can be obtained by changing the degree of concavity or convexity.

Projection Display Apparatus

A description will now be given of an example of a projection display apparatus that is provided with the above-mentioned dichroic prism. This projection display apparatus separates a light beam emitted from a light source into beams of three colors, red, blue and green, modulates the separated color beams according to image information through the use of light valves, each including a liquid crystal panel and the like, synthesizes the modulated color beams again, and projects and displays the synthesized beams onto a projection plane via a projection optical system.

Figure 5:
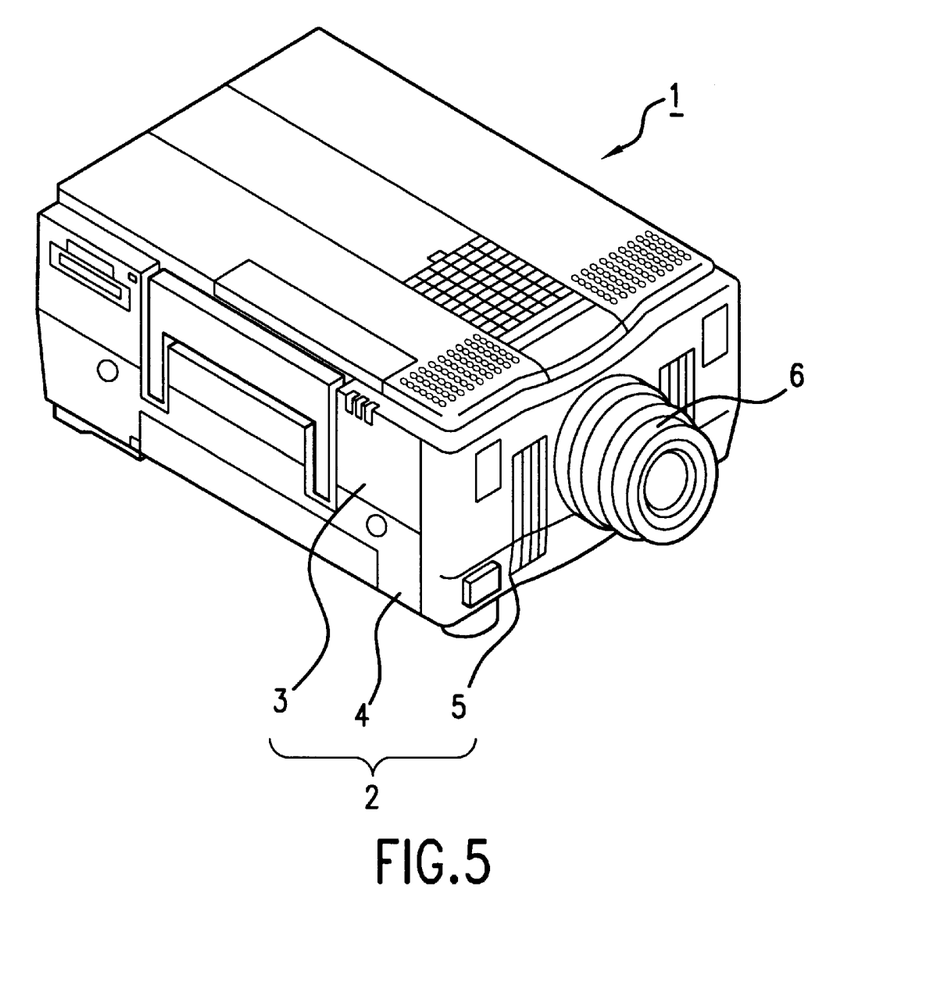
FIG. 5 is a perspective view showing the exterior of a projection display apparatus that employs the dichroic prism shown in FIG. 1 as a color synthesizing device.

FIG. 5 shows the exterior of a projection display apparatus of this embodiment. The projection display apparatus 1 of this embodiment has an outer casing 2 with a rectangular parallelopiped shape. The outer casing 2 basically includes an upper casing 3, a lower casing 4, and a front casing 5 for defining the front of the apparatus. The leading end of a projection lens unit 6 projects from the center of the front casing 5.

Figure 6:
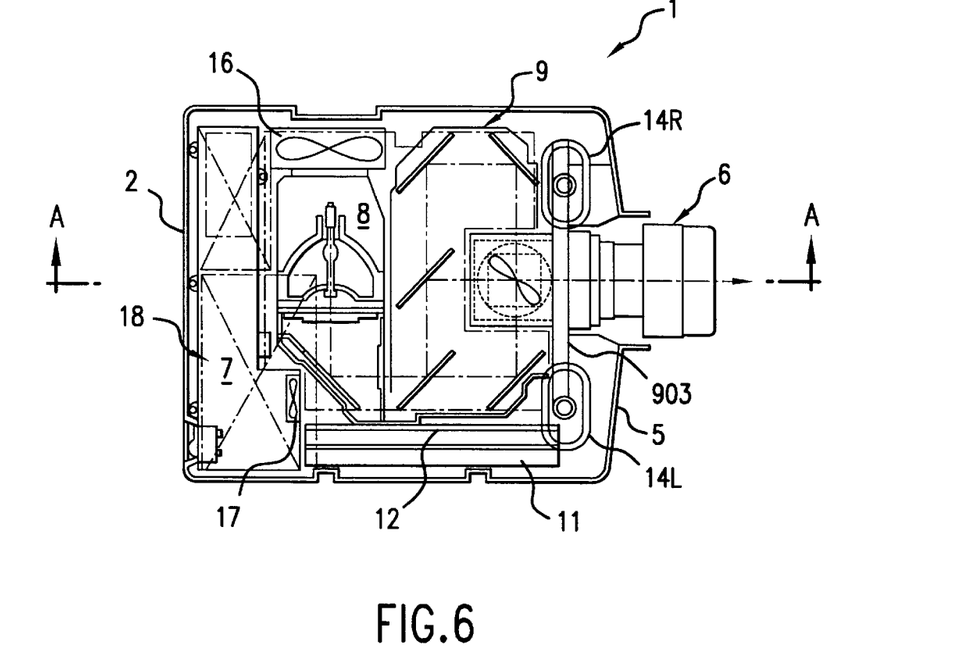
FIG. 6 is a schematic structural plan view showing the internal structure of the projection display apparatus shown in FIG. 5.
Figure 7:
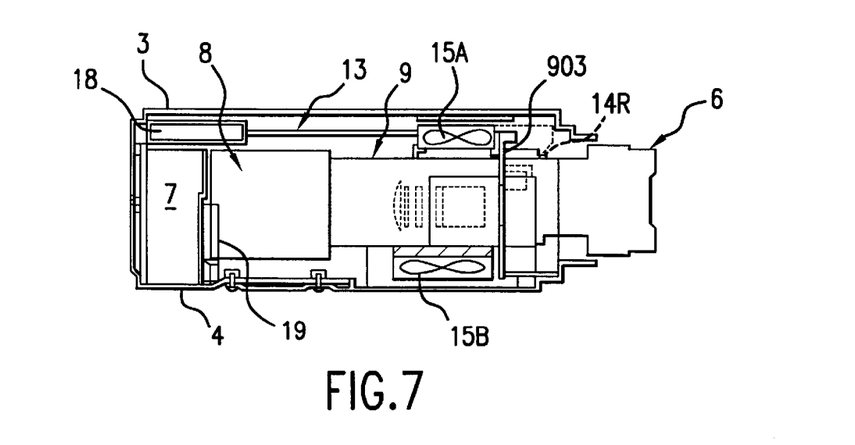
FIG. 7 is a schematic structural cross-sectional view taken along plane A—A of FIG. 6.

FIG. 6 shows the layout of constituent elements inside the outer casing 2 of the projection display apparatus 1, and FIG. 7 is a cross-sectional view taken along plane A—A in FIG. 6. As shown in these figures, a power unit 7 is placed on the rear end of the inside of the outer casing 2. A light source device 8 is placed at a position next to and offset from the power unit 7 toward the front side of the apparatus. An optical unit 9 is placed in front of the light source device 8. Positioned at the front center of the optical unit 9 is the projection lens unit 6. On the other hand, an interface substrate 11 with an input-output interface circuit mounted thereon is placed on the side of the optical unit 9 so that it extends toward the front and rear of the apparatus, and a video substrate 12 with a video signal processing circuit mounted thereon is placed in parallel therewith. Furthermore, a control substrate 13 for controlling the drive of the apparatus is placed above the light source device 8 and the optical unit 9. Speakers 14R and 14L are placed at the right and left front corners of the apparatus, respectively. A suction fan 15A for cooling is placed on the center of upper side of the optical unit 9, and a circulating fan 15B for forming a circulating stream for cooling is placed on the center of lower side of the optical unit 9. Furthermore, an exhaust fan 16 is placed on the side of the apparatus, that is, at the rear of the light source device 8. Moreover, an auxiliary cooling fan 17 for sucking the cooling air stream from the suction fan 15A into the power unit 7 is placed at a position in the power unit 7 opposed to the ends of the substrates 11 and 12.

In addition, a floppy-disk drive unit (FDD) 18 is placed directly above the power unit 7 on the left side of the apparatus.

Figure 8:
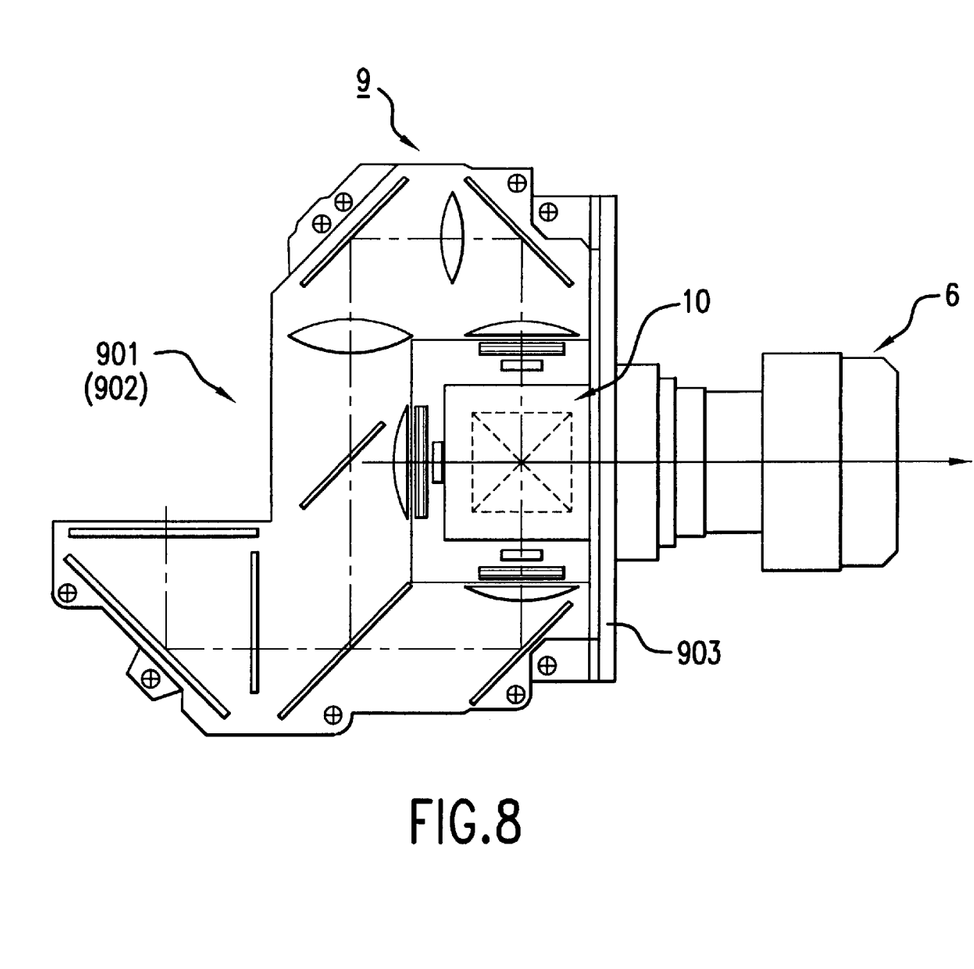
FIG. 8 is a schematic structural plan view of an optical unit and a projection lens unit.

FIG. 8 shows only the optical unit 9 and the projection lens unit 6. In the optical unit 9, as shown in this figure, optical elements other than the dichroic prism 10 for forming the color synthesizing device are vertically sandwiched and held between upper and lower light guides 901 and 902. The upper and lower light guides 901 and 902 are fixed by fixing screws on the sides of the upper casing 3 and the lower casing 4, respectively. Moreover, the upper and lower light guides 901 and 902 are similarly fixed on the sides of the dichroic prism 10 by fixing screws. The dichroic prism 10 is fixed on the rear of a thick head plate 903 made of a die-cast plate by fixing screws. The projection lens unit 6 is similarly fixed on the front of the head plate 903 by fixing screws.

Figure 9:
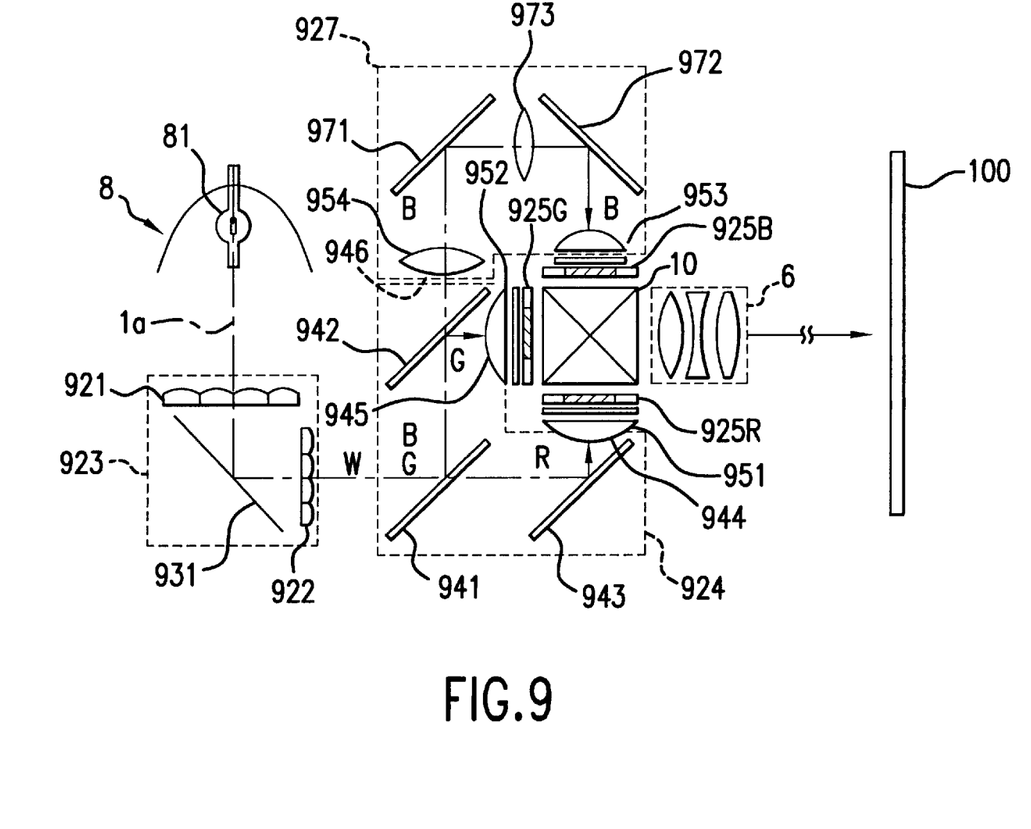
FIG. 9 is a schematic structural view of an optical system incorporated in the optical unit.

FIG. 9 schematically shows the configuration of an optical system incorporated in the projection display apparatus 1. The optical system of this embodiment includes a lamp 81 serving as a constituent element of the aforesaid light source device 8, and a uniform illumination optical system 923 that includes integrator lenses 921 and 922 serving as uniform illumination optical devices. The optical system also includes a color separation optical system 924 for separating a light beam W emitted from the uniform illumination optical system 923 into color beams R, G and B of red, green and blue, three liquid crystal light valves 925R, 925G, and 925B serving as light valves for modulating the color beams, the dichroic prism 10 serving as a color synthesizing optical system for synthesizing the modulated color beams again, and the projection optical system 60 serving as a constituent element of the projection lens unit 6 for enlarging and projecting the synthesized beams onto the surface of the projection plane 100. The optical system further includes a light guide system 927 for guiding the blue beam B of the color beams separated by the color separation optical system 924 to the corresponding liquid crystal light valve 925B.

The uniform illumination optical system 923 includes a reflecting mirror 931 for bending a center optical axis la of light emitted from the illumination optical system into right angles toward the front of the apparatus. The integrator lenses 921 and 922 intersect at right angles so that the mirror 931 is located therebetween.

Light emitted from the lamp 81 is projected as a secondary light source image onto the incident surface of each of the lenses that constitute the integrator lens 922, via the integrator lens 921. An object to be illuminated is irradiated with emergent light from the integrator lens 922.

The color separation optical system 924 includes a blue-green reflecting dichroic mirror 941, a green reflecting dichroic mirror 942, and a reflecting mirror 943. First, the blue beam B and the green beam G contained in the light beam W are reflected at right angles by the blue-green reflecting dichroic mirror 941, and directed toward the green reflecting dichroic mirror 942.

The red beam R passes through the mirror 941, is reflected at right angles by the reflecting mirror 943 located behind, and is emitted from an emergent section 944 for the red beam R toward the dichroic prism 10. Only the green beam G of the blue and green beams B and G reflected by the mirror 941 is reflected at right angles by the green reflecting dichroic mirror 942, and is emitted from an emergent section 945 for the green beam G toward the color synthesizing optical system. The blue beam B passed through the mirror 942 is emitted from an emergent section 946 for the blue beam B toward the light guide system 927. In this embodiment, all the distances between the emergent section for the light beam W of the uniform illumination optical device and the emergent sections 944, 945 and 946 for the color beams of the color separation optical system 924 are equal.

Condenser lenses 951 and 952 are placed on the emergent sides of the emergent sections 944 and 945 for the red and green beams R and G in the color separation optical system 942, respectively. Therefore, the red and green beams R and G emitted from the emergent sections respectively enter the condenser lenses 951 and 952, where they are collimated.

The red and green beams R and G thus collimated are made incident on the liquid crystal light valves 925R and 925G, modulated, and given image information corresponding to the colors. That is, these light valves are subjected to switching control according to image information by a drive device that is not shown, whereby the color beams passing therethrough are modulated. As such a drive device, a well-known device may be used unchanged. On the other hand, the blue beam B is guided to the corresponding liquid crystal light valve 925B via the light guide system 927, and similarly modulated according to image information. In the light valves of this embodiment, for example, a polysilicon TFT may be used as a switching device.

The light guide system 927 includes a condenser lens 954 placed on the emergent side of the emergent section 946 for the blue beam B, an incident-side reflecting mirror 971, an emergent-side reflecting mirror 972, an intermediate lens 973 interposed between these mirrors, and a condenser lens 953 placed upstream of the liquid crystal light valve 925B. The blue beam B of the color beams has the longest optical path length, that is, the distance between the lamp 81 and the liquid crystal panel for the blue beam B is the longest, and therefore, the amount of light of the blue beam B to be lost due to diffusion of light beams is the largest. The light loss can, however, be restricted by interposing the light guide system 927 therebetween.

Next, the color beams modulated through the liquid crystal panels 925R, 925G, and 925B are caused to enter the dichroic prism 10, where they are synthesized again. A color image obtained by synthesizing is enlarged and projected onto the surface of the projection plane 100, which is placed at a predetermined position, via the projection optical system 60 as a constituent element of the projection lens unit 6.

The projection display apparatus 1 thus structured includes the dichroic prism 10, to which the present invention is applied, as a color synthesizing device. The dichroic prism 10 can reduce relative image displacements of the color beams R, G and B caused by chromatic aberration of magnification, as mentioned above. This makes it possible to avoid image degradation due to chromatic aberration of magnification. Furthermore, since image degradation due to pixel displacements of the color beams caused by chromatic aberration of magnification can be prevented even when the size of each pixel in the liquid crystal light valves 925R, 925G and 925B is reduced and the number of pixels is increased in order to project an image at higher resolution, it is possible to provide a projection display apparatus that is able to project a high-resolution and high-quality projection image.

Second Embodiment

Figure 10:
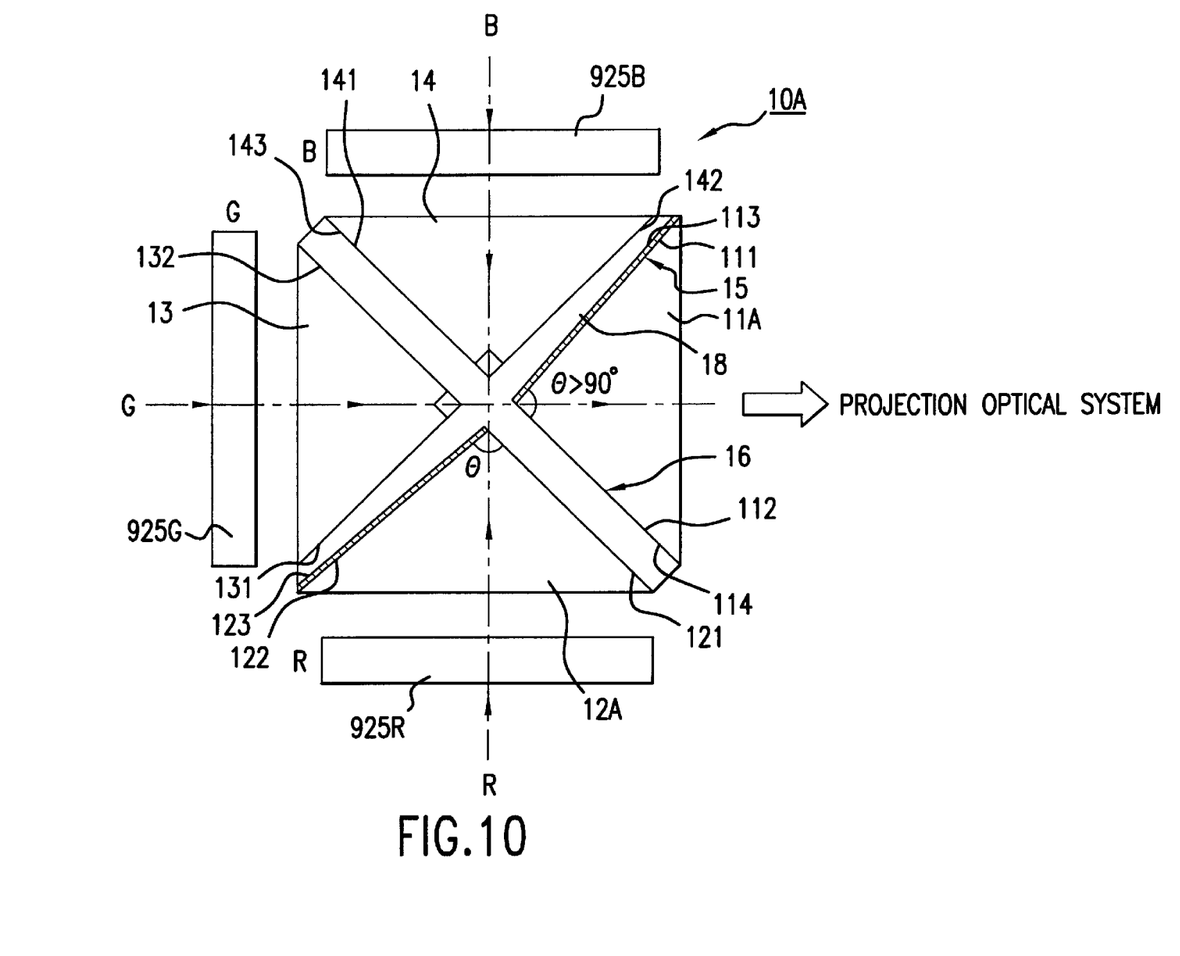
FIG. 10 is an enlarged plan view of a dichroic prism having another structure to which the present invention is applied.

FIG. 10 shows a dichroic prism having another structure to which the present invention is applied. A dichroic prism 10A of this embodiment is different from the dichroic prism 10 of the first embodiment in that the first and second rectangular prisms 11 and 12 of the four rectangular prisms 11–14 are replaced with triangular prisms 11A and 12A in each of which a vertical angle near the center of the junction of the prisms is obtuse.

In this embodiment, the first triangular prism 11A and a fourth rectangular prism 14 are joined to each other while adjusting the thickness of an adhesive layer 118 so that rectangular sides 112 and 141 provided with blue reflecting films 114 and 143 thereon form a flat plane, thereby forming a compound prism. Furthermore, the second triangular prism 12A and a rectangular prism 13 are joined to each other while adjusting the thickness of the adhesive layer 118 so that rectangular sides 121 and 132 form a flat plane, thereby forming a compound prism. After that, the compound prisms are joined through the adhesive layer 118 of uniform thickness. At this time, since the triangular prisms 11A and 12A are not rectangular prisms, a convex red reflecting dichroic plane 15 is naturally formed by a red reflecting film 113 formed on a rectangular side 111 of the first triangular prism 11A and a red reflecting film 113 formed on a rectangular side 122 of the second triangular prism 12A. Next, the compound prisms are joined to each other. As a result, it is possible to obtain the dichroic prism 10A having the convex red dichroic plane 15 whose center is disposed at the highest point.

Even if one of the first and second triangular prisms 11A and 12A is replaced with a rectangular prism, the convex red dichroic plane 15 can be formed in a similar manner to above. Furthermore, in order to make the red dichroic plane 15 concave-shaped, one of the first and second triangular prisms 11A and 12A is replaced with a triangular prism whose vertical angle near the center of the junction of the prisms is acute.

The dichroic prism 10A thus constructed has similar advantages to those of the first embodiment because the red reflecting dichroic plane 15 is convex. In addition, since the convex red reflecting dichroic plane 15 is naturally formed in the dichroic prism 10A of this embodiment at the time when the first and second triangular prisms 11A and 12A are joined to each other, there is no need to intentionally change the thickness of the adhesive layer 118 in the step of joining the compound prisms. Consequently, it is possible to facilitate the operation of joining the prisms, and to manufacture a dichroic prism at low cost.

In this embodiment, the projection images R', G' and B' of three colors can also be almost equal in area by making the red dichroic plane 15 convex, and by making the blue reflecting dichroic plane 16 concave on the side of the incident blue beam B. Furthermore, this embodiment is enabled by the selection of the concavity and convexity of the dichroic planes 15 and 16 to be applied to not only the case in which the sizes of the projection images R', G' and B' of the color beams R, G, and B decrease in this order, but also to all cases, in the same manner as the first embodiment.

Other Embodiments

While the above-mentioned projection display apparatus is a projection display apparatus provided with transmissive light valves, the dichroic prism of the present invention is also applicable to a projection display apparatus provided with reflective light valves. In this case, it is possible to cause the dichroic prism of the present invention to function as a color separation device and a color synthesizing device, and to thereby achieve a compact optical system.

Furthermore, while the projection display apparatus is a front-projection display apparatus that performs projection from the side for viewing a projection plane, the color synthesizing device of the present invention is also applicable to a rear-projection display apparatus that performs projection from the side opposite to the side for viewing the projection plane.

Advantages

As mentioned above, the dichroic prism of the present invention enlarges and reduces a color beam by making a dichroic plane either concave or convex, in order to change the reflection state of the color beam. Therefore, when the dichroic prism of the present invention is employed as a color synthesizing device in a projection display apparatus, it is possible to correct chromatic aberration of magnification, and to thereby lessen relative displacements of projection pixels of color beams. This makes it possible to prevent degradation of a projection image resulting from chromatic aberration of magnification. In particular, the dichroic prism of the present invention is considerably useful as a color synthesizing device for use in a projection display apparatus that projects a high-resolution and high-quality image with a high-definition light valve.

What is claimed is:

1. A dichroic prism, comprising:
    four prisms that are joined together, each of the four prisms having a triangular cross-section and joint surfaces; and
    a first dichroic plane and a second dichroic plane, the first dichroic plane and the second dichroic plane intersecting so as to form approximately an X shape along the joint surfaces of the four prisms, the first dichroic plane and the second dichroic plane having different reflectance characteristics, at least the first dichroic plane being at least one of concave shape and convex shape.

2. The dichroic prism according to claim 1, the first dichroic plane being inclined symmetrically relative to a line of intersection of said first dichroic plane and the second dichroic plane.

3. The dichroic prism according to claim 1, further including an adhesive layer joining the prisms, the four prisms each being a rectangular prism with a right vertical angle, and the first dichroic plane is made to be at least one of concave shape and convex shape by adjusting a thickness of the adhesive layer.

4. The dichroic prism according to claim 1, at least one of the four prisms having at least one of an acute vertical angle and an obtuse vertical angle, and the first dichroic plane is made to be at least one of concave shaped and convex shaped by using the prism having the at least one of an acute vertical angle and an obtuse vertical angle.

5. A projection display apparatus for projecting image to a projection plane and having the dichroic prism claimed in claim 1, comprising:
    a light source that emits a light beam;
    color separation means for separating the light beam emitted from said light source into color beams of at least two colors;
    modulation means for modulating the separated color beams according to image information, the dichroic prism synthesizing the color beams modulated by said modulation means; and
    a projection optical system that enlarges and projects the synthesized beams onto the projection plane.

6. The projection display apparatus according to claim 5, the modulation means being of a reflective type, and the dichroic prism also functioning as the color separation means.

7. The dichroic prism according to claim 2, further including an adhesive layer joining the prisms, the four prisms each being a rectangular prism with a right vertical angle, and the first dichroic plane is made to be at least one of concave shaped and convex shaped by adjusting a thickness of the adhesive layer.

8. The dichroic prism according to claim 2, at least one of the four prisms having at least one of an acute vertical angle and an obtuse vertical angle, and the first dichroic plane is made to be at least one of concave shape and convex shape by using the prism having the at least one of an acute vertical angle and an obtuse vertical angle.

9. A projection display apparatus for use with a projection plane and having the dichroic prism claimed in claim 2, comprising:
    a light source that emits a light beam;
    color separation means for separating the light beam emitted from said light source into color beams of at least two colors;
    modulation means for modulating the separated color beams according to image information, the dichroic prism synthesizing the color beams modulated by the modulation means; and
    a projection optical system that enlarges and projects the synthesized beams onto the projection plane.

10. The projection display apparatus according to claim 9, the modulation means being of a reflective type, and the dichroic prism also functioning as the color separation means.

11. A projection display apparatus for use with a projection plane and having the dichroic prism claimed in claim 3, comprising:
    a light source that emits a light beam;
    color separation means for separating the light beam emitted from said light source into color beams of at least two colors;
    modulation means for modulating the separated color beams according to image information, the dichroic prism synthesizing the color beams modulated by the modulation means; and
    a projection optical system that enlarges and projects the synthesized beams onto the projection plane.

12. The projection display apparatus according to claim 11, the modulation means being of a reflective type, and the dichroic prism also functioning as the color separation means.

13. A projection display apparatus for use with a projection plane and having the dichroic prism claimed in claim 4, comprising:
    a light source that emits a light beam;
    color separation means for separating the light beam emitted from said light source into color beams of at least two colors;
    modulation means for modulating the separated color beams according to image information, the dichroic prism synthesizing the color beams modulated by the modulation means; and
    a projection optical system that enlarges and projects the synthesized beams onto the projection plane.

14. The projection display apparatus according to claim 13, the modulation means being of a reflective type, and the dichroic prism also functioning as the color separation means.

15. A method of manufacturing a dichroic prism, comprising the steps of:
    joining four prisms together, each of the four prisms having a triangular cross-section and joint surfaces; and
    forming a first dichroic plane and a second dichroic plane into approximately an X shape along the joint surfaces of the four prisms, the first dichroic plane and the second dichroic plane having different reflectance characteristics, at least the first dichroic plane being at least one of concave shape and convex shape.

16. The method according to claim 15, further including the step of inclining the first dichroic plane symmetrically relative to a line of intersection of the first dichroic plane and the second dichroic plane.

17. The method according to claim 15, further including the step of forming the first dichroic plane into at least one of a concave shape and a convex shape by adjusting a thickness of an adhesive layer that joins the prisms.

18. The method according to claim 15, further including the step of forming the first dichroic plane into at least one of a concave shape and a convex shape by using at least one of the four prisms that has at least one of an acute vertical angle and an obtuse vertical angle.

\* \* \* \* \*